US007367238B2

(12) United States Patent
Hanks

(10) Patent No.: US 7,367,238 B2
(45) Date of Patent: May 6, 2008

(54) TEST APPARATUS USING A PNEUMATIC COLLET AND METHOD TO CLAMP A BAR

(75) Inventor: John Stephen Hanks, Valencia, CA (US)

(73) Assignee: HR Textron, Inc., Santa Clara, CA (US)

( * ) Notice: Subject to any disclaimer, the term of this patent is extended or adjusted under 35 U.S.C. 154(b) by 13 days.

(21) Appl. No.: 11/303,407

(22) Filed: Dec. 16, 2005

(65) Prior Publication Data

US 2007/0137322 A1 Jun. 21, 2007

(51) Int. Cl.
*B23B 5/22* (2006.01)
*G01N 3/04* (2006.01)
*G01N 3/22* (2006.01)

(52) U.S. Cl. ................ 73/856; 269/24; 269/48.1; 279/4.04; 279/4.07

(58) Field of Classification Search ............. 269/24, 269/25, 35, 48.1, 86, 55–85; 279/4.04, 4.07, 279/4.09, 43, 50; 73/853, 856
See application file for complete search history.

(56) References Cited

U.S. PATENT DOCUMENTS

| | | | | |
|---|---|---|---|---|
| 2,418,082 A | * | 3/1947 | Marasko | 279/4.09 |
| 2,728,579 A | * | 12/1955 | Djidich | 279/43 |
| 2,783,051 A | * | 2/1957 | Stromme | 279/50 |
| 3,073,612 A | | 1/1963 | Birdsall | 279/4 |
| 3,533,636 A | * | 10/1970 | Firestone et al. | 279/4.07 |
| 4,171,820 A | * | 10/1979 | Klancnik | 279/50 |
| 4,391,451 A | * | 7/1983 | Secor et al. | 279/2.09 |
| 4,511,295 A | | 4/1985 | Razdobreev | 409/233 |
| 4,525,097 A | * | 6/1985 | Ziegelmeyer | 403/259 |
| 4,558,554 A | | 12/1985 | Herbert | 53/331.5 |
| 4,577,732 A | | 3/1986 | Gottling | 188/67 |
| 4,690,415 A | * | 9/1987 | Holdridge | 279/4.09 |
| 4,791,841 A | | 12/1988 | Pruvot et al. | 82/30 |
| 5,108,236 A | | 4/1992 | Arai et al. | 409/163 |
| 5,178,428 A | * | 1/1993 | Lombardi et al. | 294/88 |

(Continued)

FOREIGN PATENT DOCUMENTS

DE 3615985 A1 5/1986

(Continued)

OTHER PUBLICATIONS

International Search Report, PCT/US2006/047653, Total pp. 5, date mailed Jun. 6, 2007.

*Primary Examiner*—Hezron E. Williams
*Assistant Examiner*—David A. Rogers
(74) *Attorney, Agent, or Firm*—BainwoodHuang

(57) ABSTRACT

A pneumatic collet assembly has a housing, a piston, a collet, and ball bearings. The piston is disposed within the housing. A bore within the piston receives the collet. The collet has a base and fingers. The fingers of the collet define a center channel or bore configured to receive a torsion bar. The central channel extends along a longitudinal axis. The ball bearings are disposed between the piston and the fingers of the collet. The piston is configured to move between a first position along the longitudinal axis and a second position along the longitudinal axis in response to pressure changes within the housing. The piston increases force against the ball bearings to urge the fingers of the collet against the torsion bar to clamp the torsion bar.

12 Claims, 8 Drawing Sheets

U.S. PATENT DOCUMENTS

| | | | |
|---|---|---|---|
| 5,441,284 A * | 8/1995 | Mueller et al. | 279/2.02 |
| 5,522,605 A | 6/1996 | Lewis et al. | 279/49 |
| 5,979,267 A * | 11/1999 | Yonezawa | 74/531 |
| 6,036,415 A | 3/2000 | Sheehan et al. | 409/231 |
| 6,145,849 A * | 11/2000 | Bae et al. | 279/4.07 |
| 6,152,268 A | 11/2000 | Goellner et al. | 188/67 |
| 6,250,619 B1 | 6/2001 | Cook et al. | 269/20 |
| 6,290,241 B1 | 9/2001 | Fink et al. | 279/50 |
| 6,497,417 B2 * | 12/2002 | Wu | 279/4.08 |
| 6,588,316 B1 | 7/2003 | Armitage | 92/169.1 |
| 2004/0123732 A1 | 7/2004 | Lindsay | 92/93 |
| 2004/0164547 A1 | 8/2004 | Cronley | 285/34 |
| 2005/0161889 A1 * | 7/2005 | Casel | 279/43 |

FOREIGN PATENT DOCUMENTS

| | | |
|---|---|---|
| EP | 0 841 120 A1 | 5/1998 |
| GB | 391295 | 4/1933 |
| WO | WO 2005/050030 | 6/2005 |

* cited by examiner

US 7,367,238 B2

TEST APPARATUS USING A PNEUMATIC COLLET AND METHOD TO CLAMP A BAR

BACKGROUND

In the production of equipment, components of the equipment are tested to determine that the component is working properly. One such test is to determine if a drive mechanism is rotating the component properly based on the input when the drive mechanism has a load that simulates real life conditions. For example, a drive mechanism rotates a shaft to control or manipulate an air-loaded control surface, such as an air foil or rudder.

One such technique of testing is to secure a torsion bar to the end of the drive mechanism. The torsion bar is held to simulate loading of the surface.

Traditionally, the torsion bar has been clamped either with a disc brake design or high-pressure hydraulic collets. Both of these techniques have shortcomings.

The disc brake design requires pads that attach to the torsion bar. The pads are clamped with a brake caliper similar to wheels on a vehicle. However in that the pads are extruded radially from the torsion bar, the pads add rotational inertia resulting in not accurately simulating the loading of the surface. This increased rotational inertia is not desired during performance testing. In addition, the brake calipers are typically driven electrically and therefore have additional electrical requirements.

The high-pressure hydraulic collets use hydraulics to compress a collet onto the torsion bar. Either a hand pump or high-powered electric pump is typically used to provide the pressure for the hydraulics. The hand pump has many shortcomings including the additional time required by a test technician to create the needed pressure. In addition, the requirement to test components quickly, i.e., a high volume production, necessitates the need for quick connections. These quick connects and fluid leakage from collets adds a concern. The leakage could create spills that are potential safety hazards. In addition, leakage on the torsion bar clamping area would create a decrease in clamping friction requiring more clamping load. Likewise, the need for electricity for the pump makes it more difficult to test components quickly and efficiently.

SUMMARY

Unfortunately, there are deficiencies to the above-described testing apparatus including concerns with using hydraulics and/or electrical requirements. Furthermore the addition of pads on the torsion bar increases rotational inertia and therefore results in not properly simulating the load.

In contrast to the above-described conventional testing approaches, improved techniques are directed to testing using a pneumatic collet assembly that does not require hydraulics and does not require pads or other items that will influence the rotational inertia improperly.

One embodiment is directed to a pneumatic assembly which includes a piston disposed in a housing. A bore within the piston receives the collet. The collet has a base and fingers. The fingers of the collet define a center channel or bore configured to receive a torsion bar. The central channel extends along a longitudinal axis. The ball bearings are disposed between the piston and the fingers of the collet. The piston is configured to move between a first position along the longitudinal axis and a second position along the longitudinal axis in response to pressure changes within the housing. The piston increases force against the ball bearings to urge the fingers of the collet against the torsion bar to clamp the torsion bar.

The housing defines a chamber having a clamping port and an unclamping port. The ports are connected to a source of pressurized air; such as shop air. The piston has an annular ring that encircles the bore of the piston and divides the chamber. The annular ring of the piston has a pair of face walls. The first face wall is in communication with the clamping port and the second face wall is in communication with the unclamping port. The piston moves between the first position and the second position by the ports allowing pressurized air into and out of the chamber divided by the annular ring of the piston.

In some arrangements of the pneumatic collet, each finger of the collet has a finger ball channel. The finger ball channels of the fingers are angled such that the finger channels are further from the longitudinal axis at the distal end than at the base. In addition, the bore of the piston has a plurality of piston ball channels. The collet is received in the bore of the piston such that the finger channel of each finger of the collet is aligned with a piston ball channel of the piston. The piston ball channels of the piston are angled such that the piston channels are further from the longitudinal axis at an end closer to the distal end of the fingers of the collet. The ball bearings are interposed in the ball channels between the collet and the piston.

In one arrangement, the aligned channels of the collet and the piston are at an angle of between 1 and 2 degrees from that of the longitudinal axis. In addition, the aligned channels of the collet and the piston are parallel to each other.

The channels of the collet and the channels of the pistons in the pneumatic collet assembly are semi-cylindrical. The channels have a diameter substantially equal to the diameter of the ball bearings. The ball bearings transfer load to the channels along a line.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved pneumatic collet assembly utilizes a piston which moves between a first position along a longitudinal axis which forces ball bearings and collet fingers toward a torsion bar to clamp the torsion bar in place and a second position along the longitudinal axis which releases the torsion bar. The use of an air-controlled piston and ball bearings to move the collet fingers enables tight clamping of the torsion bar as well as easy release with minimal piston stroke and manageable amounts of air pressure. Accordingly, conventional approaches to clamping torsion bars using disk brakes or extremely high amounts of pressure are unnecessary.

Figure 1:
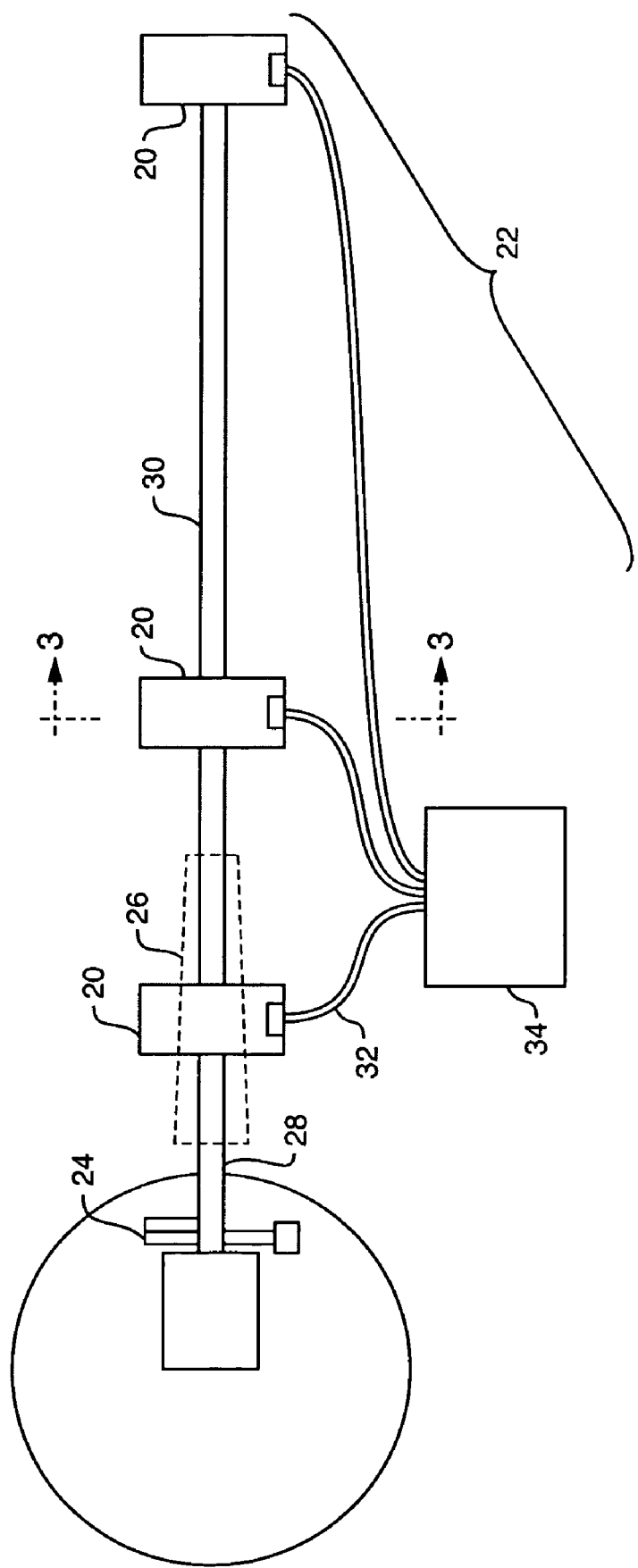
FIG. 1 is a schematic showing a test fixture having a plurality of pneumatic collets.

When referring to the drawing in the description which follows, like numerals indicate like elements. FIG. 1 shows a pneumatic collet 20 as part of a test stand 22. Improvements to a test stand 22 include having a plurality of pneumatic collets 20 that are operated by pneumatic or shop air to move a piston within the collet to force a plurality of ball bearings radially inward to force a plurality of fingers of the collet to clamp on a torsion bar therein having the benefit of tight clamping of the torsion bar and easy release with minimum stroke of the piston and avoiding shortcomings associated with hydraulics, additional electrical requirements, and adding items that result in added rotational inertia.

Referring to FIG. 1, the test stand 22 has a plurality of pneumatic collets 20 for testing of a drive mechanism 24, particularly a torsional drive mechanism. The drive mechanism 24 in normal operation is for the moving of an air-load surface 26, such as an aileron, shown in phantom. The aileron 26 is connected to a shaft 28 that is rotated by the drive mechanism 24. The test stand 22 has a torsion bar 30 that is secured to the shaft 28. The torsion bar 30 is extended through at least one pneumatic collet 20 (three shown in FIG. 1).

Figure 2:
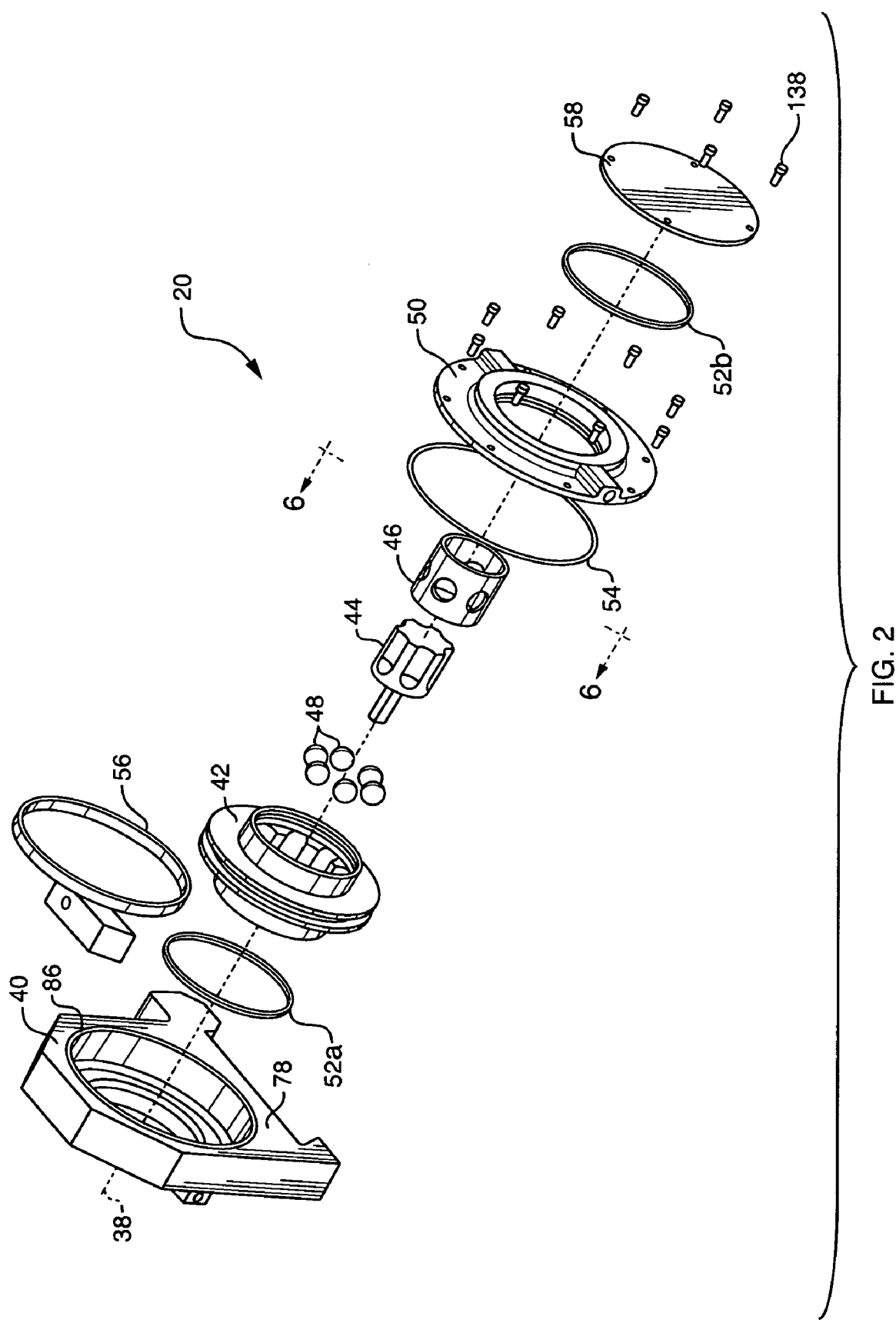
FIG. 2 is an exploded view of the pneumatic collet.

Referring to FIG. 2, an exploded view of the pneumatic collet 20 along a longitudinal axis 38 is shown. The pneumatic collet 20 has a housing 40, a piston 42, a collet 44, a ball cage 46, a plurality of ball bearings 48, and a sleeve 50. In addition, the pneumatic collet 20 has a plurality of sealing rings 52a and 52b, 54, and 56 for sealing a chamber as described in more detail below. The pneumatic collet 20 also has a cover 58. The pneumatic collet 20 has a plurality of fasteners securing components of the pneumatic collet 20 as described below.

Figure 3:
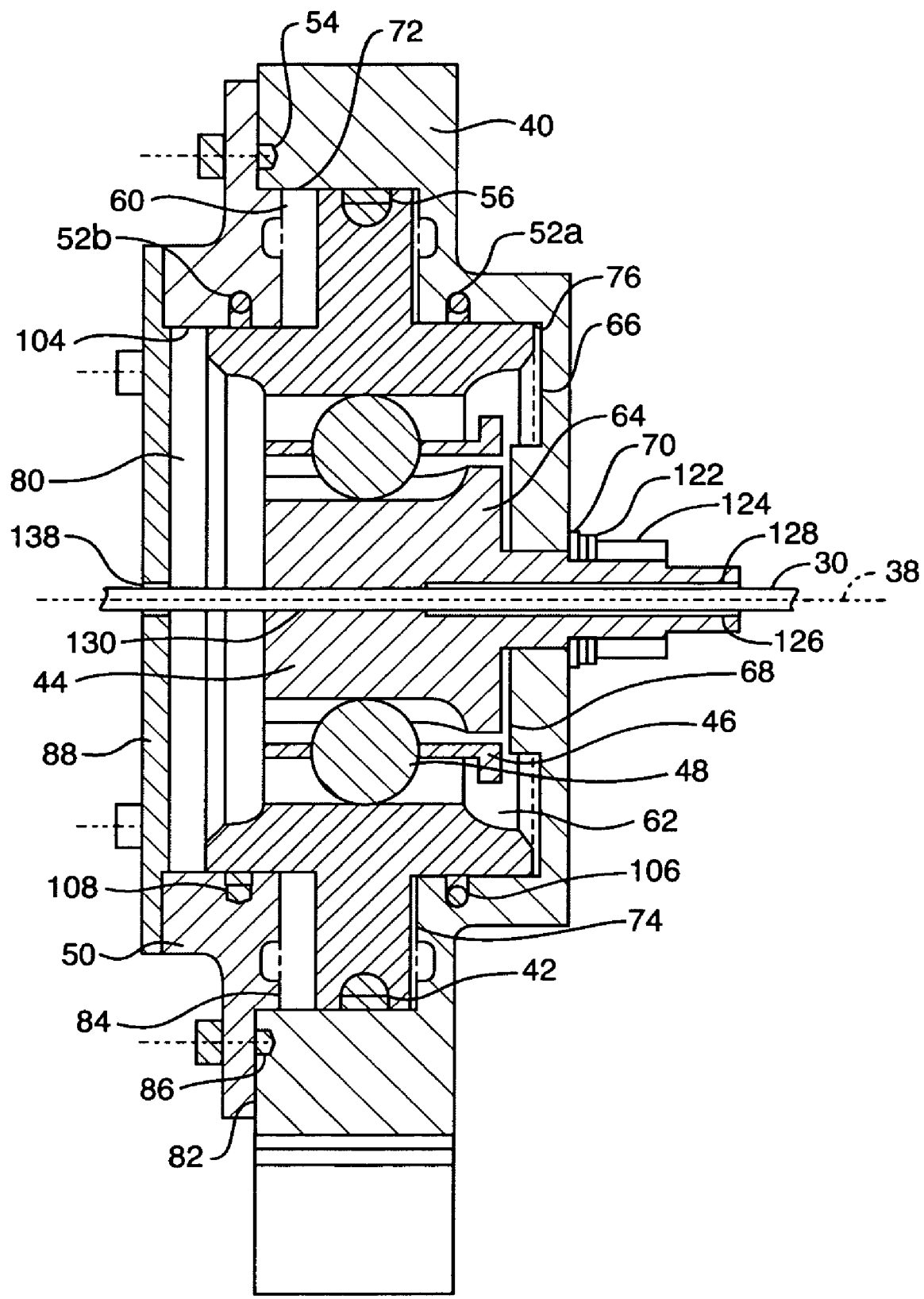
FIG. 3 is a sectional view of the pneumatic collet with a torsion bar extending through the pneumatic collet.

Referring to FIG. 3, a sectional view of the pneumatic collet 20 taken along the line 3-3 of FIG. 1 is shown. Generally, the piston 42 is moved, to the left in the figure, to move the ball bearings 48 to have the collet 44 clamp the torsion bar 30 to stop rotation of the torsion bar 30 at the location of the pneumatic collet 20 as explained below.

The housing 40 has a first cylindrical bore 60 and a second cylindrical bore 62 which has a smaller diameter and extends deeper than the first cylindrical bore 60. The bores 60 and 62 are co-axial along the longitudinal axis 38. The second cylindrical bore 62 ends in a base 64 of the housing 40 having an annular ring 66 and a raised center portion 68. The base 64 has an opening 70 co-axial with the bores 60 and 62 along the longitudinal axis 38.

The first cylindrical bore 60 defines a cylindrical piston riding wall 72 on the housing 40 and a piston face wall 74. The second cylindrical bore 62 defines a second or inner cylindrical piston riding wall 76.

The sleeve 50 has a cylindrical bore 80 and a pair of annular planar walls 82 and 84. The outer annular wall 82 engages a front wall 78 of the housing 40. The front wall 78 of the housing 40 has an annular groove 86 for receiving the sealing ring 54 for sealing of a portion of the chamber 88. In the embodiment shown, the remainder of the chamber 88 is open to the atmosphere. The sleeve 50 is secured to the housing 40 with a plurality of fasteners in the embodiment shown. The inner annular ring 84 defines a piston face wall, an outer head wall. The piston face wall 84 will theoretically limit the travel of the piston 42, however the interaction of the ball bearings 48 with the piston 42 and the collet 44 results in the clamping of the torsion bar 30; this clamping of the torsion bar 30 will stop the movement of the ball bearings 48 and will limit the travel of the piston 42.

Figure 4:
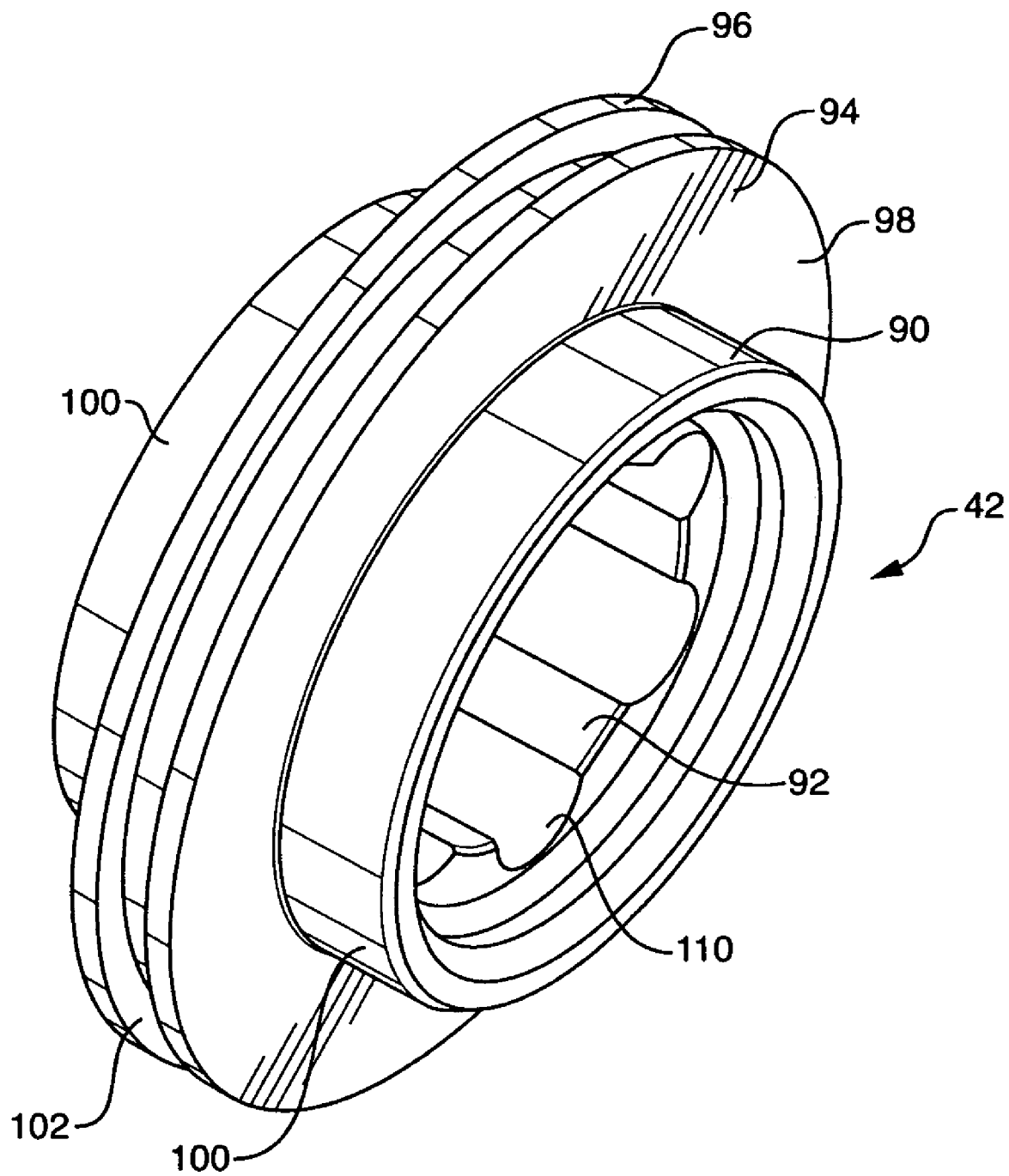
FIG. 4 is an isometric view of the piston.

Referring to FIGS. 3 and 4, the piston 42 has a base 90 having a bore 92. The piston 42 has an annular ring 94 that extends radially outward from the base 90. The annular ring 94 has an outer cylindrical wall 96 and a pair of annular piston heads 98. The base 90 of the piston 42 has a cylindrical outer wall 100.

Referring to FIG. 3, the outer cylindrical wall 96 of the annular ring 94 of the piston 42 has a groove 102 for receiving the sealing ring, piston sealing ring 56. The piston sealing ring 56 makes a sliding engagement with the piston riding wall 72 of the first cylindrical bore 60 of the housing. The inner piston riding wall 76 of the housing and the cylindrical wall 104 of the bore 80 of the sleeve 50 each have an annular groove 106 and 108, respectively for receiving the sealing rings 52a and 52b, respectively. The piston 42 has a plurality of ball channels 110 where the bore 92 of the base 90 is enlarged such that each ball bearing 48 is carried in part of the ball channel 110, as best seen in FIG. 4.

The housing 40 and the sleeve 50 define the chamber 88 in which the piston moves laterally along the longitudinal axis 38. The chamber 88 has an annular chamber 112 defined by the piston rising wall 72 and the piston face wall 74 of the housing 40, the piston face wall 84 of the sleeve 50 and the cylindrical outer wall 100 of the base 90 of the piston. The annular ring 94 of the piston 42 is located within the annular chamber 112 and has the annular piston heads 98 that are moved by the air as described below. The sealing rings 52a, 52b, and 54 assist in sealing the annular chamber 112.

Figure 5:
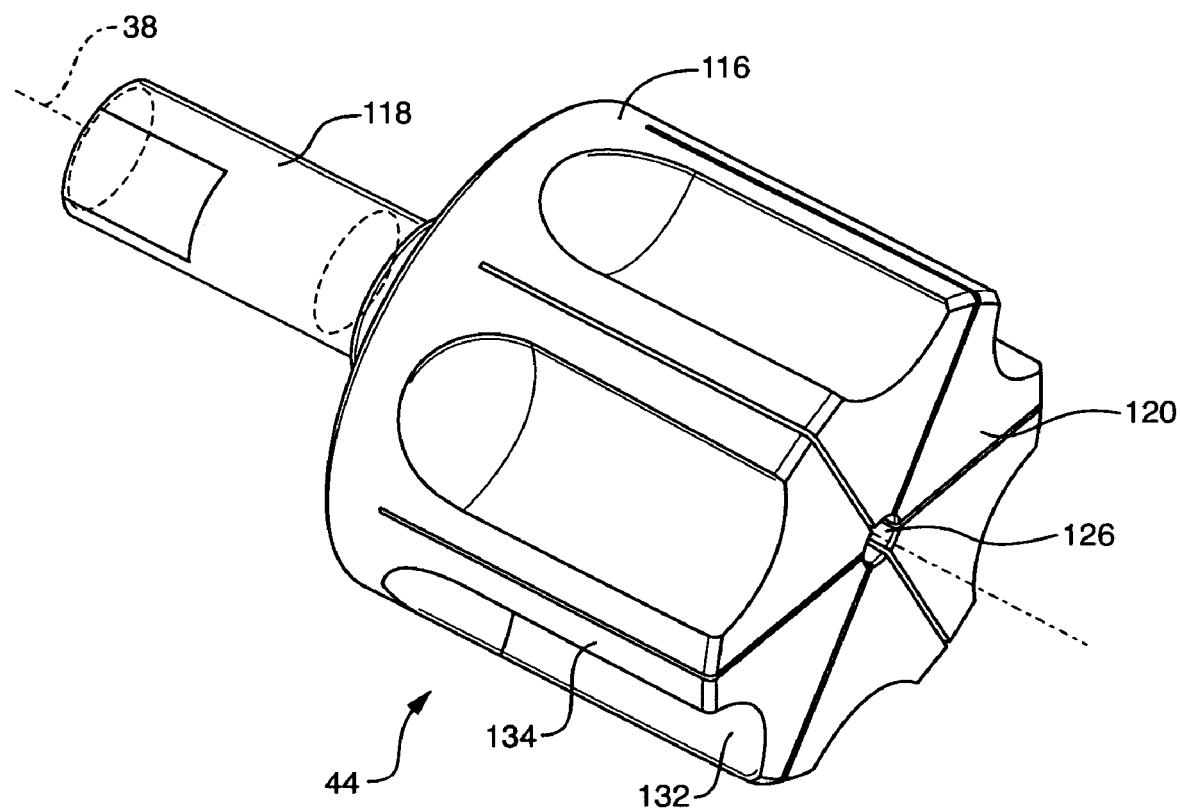
FIG. 5 is an isometric view of the collet.

Referring to FIGS. 3 and 5, the collet 44 has a base 116, a stem 118 projecting from the base 116, to the right in FIG. 3, and a plurality of fingers 120 extending from the base 116, as best seen in FIG. 5. Referring to FIG. 3, the stem 118 of the collet 44 extends through the opening 70 in the base 64 of the housing 40. A washer 122 and the nut 124 encircle the stem 118 of the collet 44 to secure the collet 44 to the housing 40. The collet 44 is limited from rotating relative to the housing 40. The collet 44 is positioned along the longitudinal axis 38.

The collet 44 has a bore 126 extending along the longitudinal axis 38 of the pneumatic collet 20. The bore 126 has a larger diameter portion 128 and a smaller diameter portion 130. The torsion bar 30 extends through the bore 126 in the collet 44. The fingers 120, at the distal end, where the bore 126 has the smaller diameter portion 130 is where the collet 44 will engage the torsion bar 30 as explained below.

In the embodiment shown, the collet 44 has six collet fingers 120. Each finger 120 projects from the base 116 and extends radially outward from the bore 126 and the longitudinal axis 38. Each of the collet fingers 120 has a ball channel 132 on the cylindrical outer wall 134 of the collet 44.

Referring to FIG. 3, the cover 58 is secured to the sleeve 50 by a plurality of fasteners. The cover 58 protects the cylindrical bore 80 of the sleeve 50. The cover 58 has an opening 138 that is centered along the longitudinal axis 38. The torsion bar 30 extends through the opening 138 when inserted into the pneumatic collar 20.

Figure 6:
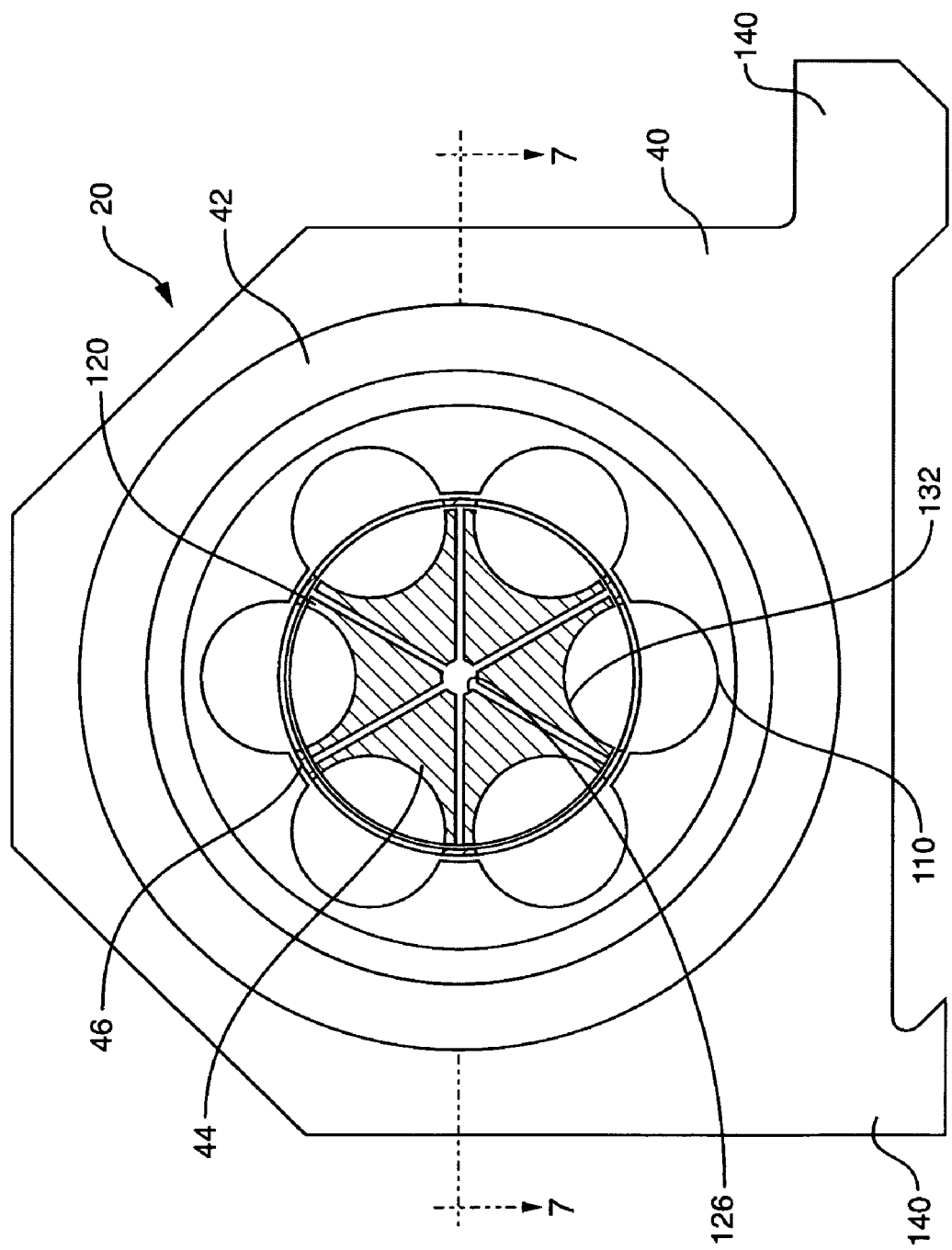
FIG. 6 is a sectional view of the pneumatic collet taken along the line 6-6 of FIG. 2.

Referring to FIG. 6, a sectional view of the housing 40, the piston 42, the ball cage 46, and the collet 44 taken along the line 6-6 of FIG. 2 is shown. The collet 44, the ball cage 46, and the piston 42 are all co-linear about the longitudinal axis 38 which extends out of the page. Each of the fingers 120 of the collet 44 extends radially from the longitudinal axis 38, which extends out of the page in the Figure, and the bore 126 for the torsion bar 30 to the ball channel 132 of the collet 44. Each of the ball channels 132 of the collet 44 is aligned with the ball channel 110 in the piston 42. A ball bearing 48 is interposed between the ball channel 132 and 110 of the collet 44 and the piston 42, respectively.

Still referring to FIG. 6, the ball cage 46 is interposed between the collet 44 and the piston 42. The ball cage 46 is used for ease of the installation of components of the pneumatic collet 20 (i.e., the collet 44 and the ball bearing 48) into the housing 40 during assembly of the pneumatic collet 20. In the embodiment shown, the ball cage 46 does not affect the workings of the pneumatic collet 20 during operation.

The housing 40 has a pair of feet 140 for mounting the pneumatic collet 20.

The ball bearings 48 and the ball channels 110 and 132 of the piston 42 and the collet 44, respectively, are sized so that the ball bearing engages a substantial portion of each of the channels. The contact is generally in a line contact wherein the line contact of each of the ball bearings 48 is in a plane that is perpendicular to the longitudinal axis 38.

Figure 7:
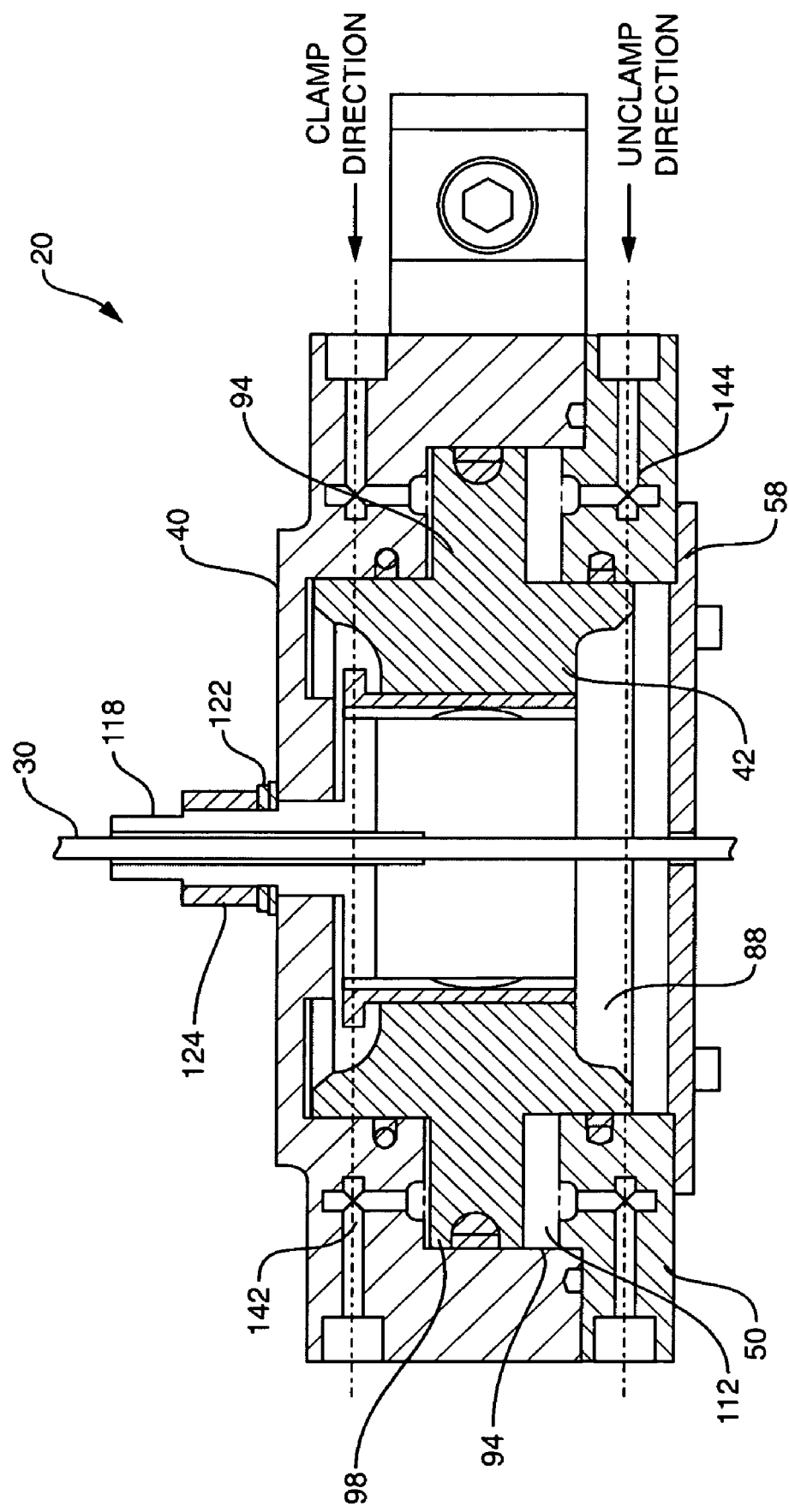
FIG. 7 is a sectional view of the pneumatic collet taken along the line 7-7 of FIG. 6.

Referring to FIG. 7, a cross-sectional view of the pneumatic collet 20 is shown. The piston 42 is located in the chamber 88 with the annular ring 94 of the piston located in the annular chamber 112. The annular chamber 112 has a clamping port 142 that opens on the piston face wall 74 of the housing 40 and an unclamping port 144 that opens on the piston face wall 84 of the sleeve 50. The ports 142 and 144 are connected to pneumatic air, shop air, through a plurality of lines 32 and a controller 34, as seen in FIG. 1.

During operation of the test stand 22, the inputting of air in the clamping port 142 in the housing 40 exerts pressure against the annular piston head 98 of the annular ring 94 of the piston. This pressure causes the piston to move towards the bottom of the page in FIG. 7. Likewise the inputting of air in the unclamping port 144 in the sleeve 50 exerts pressure against the other annular piston head 98 of the annular ring 94 of the piston 42. This pressure causes the piston 42 to move upward on the page in FIG. 7. In both cases, the port 142 or 144 that is not receiving air, is open to allow air in the annular chamber 112 on that side of the annular ring 94 of the piston 42 to exit the chamber 112 as the piston 42 moves in that direction. It is recognized that a vacuum could be placed on that side of the chamber 112 to assist in movement of the piston 42.

Figure 8:
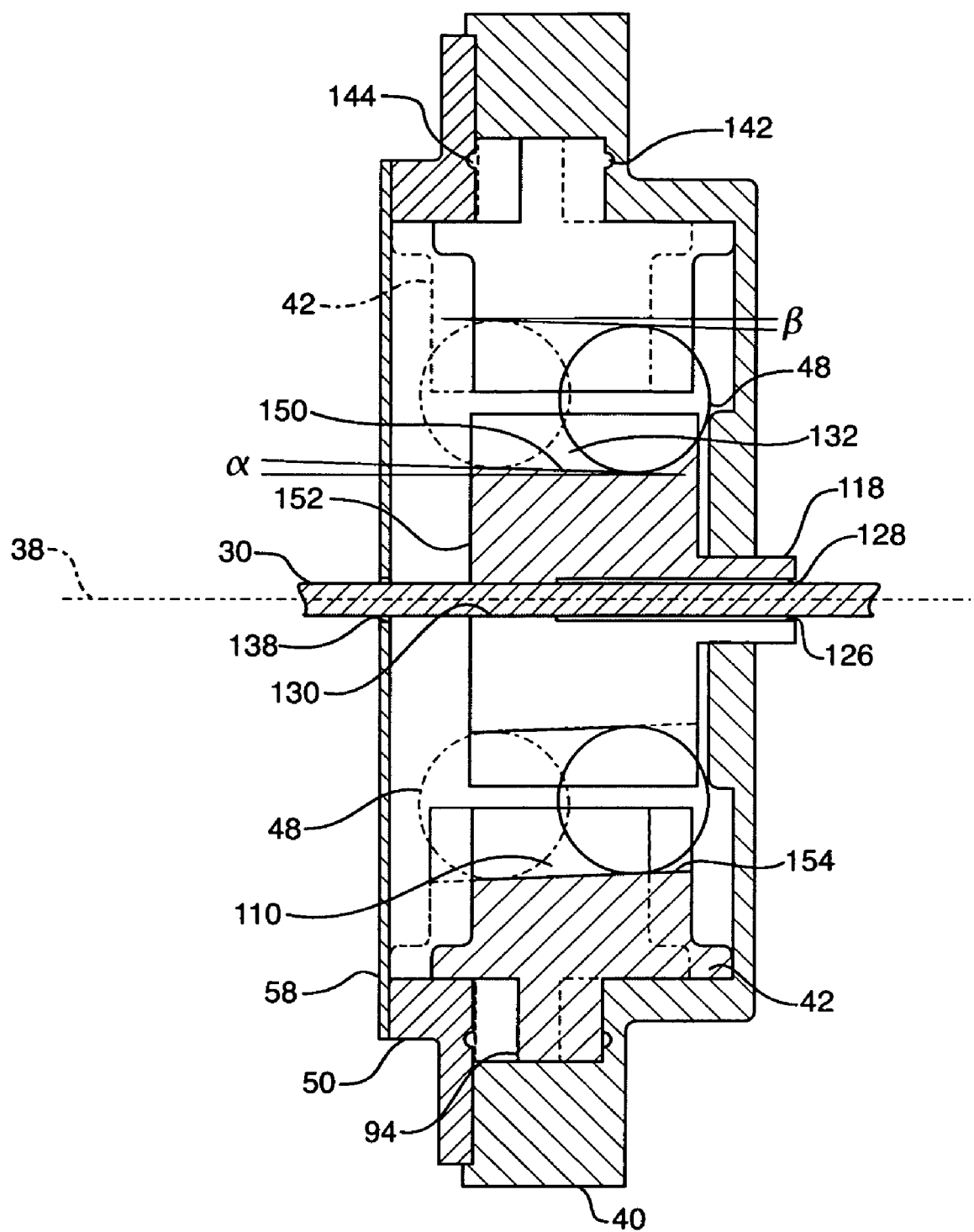
FIG. 8 is view of the relationship of the ball bearing with the piston and the collet in the unloaded position and in a loaded position in phantom.

Referring to FIG. 8, an enlarged view of the relationship of the ball channels 132 and 110 of the collet 44 and the piston 42, respectively is shown. The ball channels 132 and 110 of both the collet 44 and the piston 42 are set at an angle relative to the longitudinal axis 38. The ball channels 132 on the collet 44 are set at an angle α such that the saddle 150, the lowest point, of the ball channel 132 is further from the longitudinal axis 38 at the distal ends 152 of the fingers 120 than at the base 116 of the collet 44. The ball channels 110 on the piston 42 are set at an angle β such that the saddle 154 of the ball channel 110 is closer to the longitudinal axis 38 at the end nearer the base 64 of the housing 40 than at the end in proximity to the cover 58. In some arrangements, the angles α and β are between 1 and 2 degrees. In one arrangement, the angles α and β are identical. When the angles α and β are identical, the line of the saddles 150 and 154 of the aligned ball channels of the collet 44 and the piston 42 are parallel and at an angle α relative to the longitudinal axis 38.

As the piston 42 is moved to the left in FIG. 8, the ball bearings 48 are forced to the left and radially inward because of the shape and alignment of the ball channels 110. As the ball bearings 48 are moved to the left, the distal end 152 of the fingers 120 of the collet 44 are forced (deflected) radially inward by the ball bearings 48. The diameter of the smaller diameter portion 130 of the bore 126 is narrowed as the fingers 120 flex (deflect) inward and the fingers 120 of the collet 44 grab the torsion bar 30. The torsion bar 30 is therefore not allowed to rotate at this location. The piston 42, ball bearings 48, and the fingers 120 are shown in phantom in the clamped position.

When air is input into the unclamping port 144 of the pneumatic collet 20 and allowed to vent from the clamping port 142, as best seen in FIG. 7, the piston 42 is forced to the right in FIG. 8. As the piston 42 moves to the right the resilience of the fingers 120 of the collet 44 and the alignment of the ball channels 110 and 132 force the ball bearings 48 towards the right. This allows the bore 126 located in the collet 44 to return to its normal size wherein the torsion bar 30 extends through the pneumatic collet 20 but is limited in its movement by the pneumatic collet 20. This is considered the un-clamped position.

Details of an exemplary test operation will now be provided. Referring back to FIG. 1, the drive mechanism 24 to be tested is brought into the shop. A torsion bar 30 is secured to the shaft 28 of the drive mechanism 24 for the purpose of testing. In some arrangements, a plurality of pneumatic collets 20 are positioned such that the torsion bar extends through the bore 126, as seen in FIGS. 3 and 8. The pneumatic collets 20 are secured in the desired position that is the proper length along the torsion bar 30; aligned and held in place with feet 140. Each collet 20 is connected to shop air through a series of lines 32 and the controller 34.

Still referring to FIG. 1, the drive mechanism 24 is run through a series of tests. The pneumatic collets 20 are each in the un-clamped position, that is with the piston 42 to the right in FIG. 3. The fingers 120 of the collet 44 are not engaging the torsion bar 30.

When the test calls for a specific pneumatic collet 20 to grab the torsion bar 30, the controller 34 allows air to be fed into the clamping port 142 of the specific pneumatic collet 20 and allows air to be vented out of the un-clamping port 144. As described above, the piston 42 is moved from the unclamped position to the clamped position. The movement of the piston 42 causes the ball bearings 48 to move both towards the distal end 152 of the fingers 120 and radially inward as shown in phantom in FIG. 8. This movement results in the fingers 120 narrowing the size of the smaller diameter portion 130 of the bore 126 sufficiently to have the fingers 120 grab the torsion bar 30 with sufficient force to limit rotation of the torsion bar 30 at this location. The pneumatic collet 20 imparts a high radial load with a relatively small input of work. This high radial load is necessary because of the small torsion bar surface and low friction.

When the test calls for the specific pneumatic collet 20 to release the torsion bar, the controller 34 allows air to be fed into the un-clamping port 144 of the specific pneumatic collet 20 and allows air to be vented out of the clamping port 142. As described above, the piston 42 is moved from the clamped position to the un-clamped position. The movement of the piston 42 in conjunction with resilience of the fingers 120 of the collet 44 causes the ball bearings 48 to move both away from the distal end 152 of the fingers 120 and radially outward as shown in solid line in FIG. 8. This movement results in the fingers 120 returning to their normal position and the size of the smaller diameter portion 130 of the bore 126 being sufficiently large so that the fingers 120 do not interfere with movement of the torsion bar 30. Air can be sent to another pneumatic collet 20 to move it to the clamped position while this pneumatic collet 20 is moved to the unclamped position. The unclamping is easy to perform with little load. This is in contrast with standard metal-to-metal devices which require a large impact load.

In an embodiment contemplated for a torsion bar having a diameter smaller than 0.2 inches, the pneumatic collet 20 is connected to pneumatic pressure or shop air in the range of 50 to 80 psi (pounds per square inch). The movement of the piston 42 from the first position to the second position is approximately 0.100 inches. The ball bearings 48 are made of stainless steel having a hardness of 60 Rc (Rockwell C hardness). The piston and collet are made of hardened steel having a hardness in the range of 50 Rc to 60 Rc. The tolerance of the channels and the ball bearings are in the range of +/−0.0004 inches.

While this invention has been particularly shown and described with references to preferred embodiments thereof, it will be understood by those skilled in the art that various changes in form and details may be made therein without departing from the spirit and scope of the invention as defined by the appended claims.

For example, the pneumatic collet 20 has been described in relation to a test stand 22 for the testing of a drive mechanism 24. In the embodiment shown, the collet 44 is retained by the housing to eliminate rotation. Likewise, the piston 42 cannot rotate because of the ball bearings 48 in the channels 110 and the aligned channels 132 in the collet 44. While the torsion bar 30 is free to rotate a complete 360 degrees when unclamped, the torsion bar 30 is limited in rotation when clamped by the fingers 120 of the collet 44. It is recognized that the pneumatic collet 20 could be adapted for use with a lathe or drill where stock or tools are clamped for rotational motion. In this embodiment, the collet would be allowed to rotate relative to the housing.

The pneumatic collet 20 can be used with any geometric shaped torsion bar 30 including torsion bars having a cross sectional area that is circular, square, or hexagonal.

In the embodiment shown, the collet 44 has six fingers 120 and six ball bearings 48. It is recognized that fewer or more fingers and ball bearings can be used. The number of fingers and ball bearings is chosen to provide sufficient clamping around the collet fingers and have sufficient size ball bearings to transfer the load from the piston to the collet. Therefore, if a larger torsion bar 30 is used and therefore a larger bore 126, an increase in the number of fingers 120 and ball bearings 48 may be desired. Also, increase in the size of fingers 120 and ball bearings 48 may be desired.

While hydraulics have shortcomings as discussed above, it is recognized that it may be desirable to use hydraulics in place of pneumatics in certain situations. Likewise, it is recognized that a manual lever can be coupled to the piston to move the piston between its positions.

What is claimed is:

1. A method of clamping a bar, comprising:
    providing a collet assembly having a housing; a piston disposed within the housing, the piston defining a bore; and a collet disposed within the bore defined by the piston, the collet having a base and fingers which define a center bore extending along a longitudinal axis;
    extending the bar through the center bore of the collet that extends along the longitudinal axis;
    moving the piston from a first position to the second position in a direction along the longitudinal axis;
    moving a plurality of ball bearings disposed between the piston and the fingers of the collet longitudinal and radially inward towards the longtitudinal axis by the movement of the piston from the first position and the second position along the longitudinal axis and a second position along the longitudinal axis; and
    clamping the bar by the fingers of the collet deflected radially inward by the ball bearings;
    wherein
        each finger of the collet has a finger ball channel, the finger ball channels of the fingers being angled such that the finger ball channels are further from the longitudinal axis at a distal end than at the base,
        the bore defined by the piston having a plurality of piston ball channels,
        the collet being received in the bore of the piston of the collet assembly such that the finger ball channel of each finger of the collet aligns with a piston ball channel of the piston, the piston ball channels of the piston angled such that the piston ball channels are further from the longitudinal axis at an end closer to the distal end of the fingers of the collet, and
        the plurality of ball bearings interposed in the ball channels between the collet and the piston to provide movement of the piston along the longitudinal axis towards the distal end of the fingers to force the ball bearings to compress the fingers of the collet to clamp the torsion bar; and
    wherein moving the plurality of ball bearings includes deflecting the plurality of ball bearings along the ball channels between the collet and the piston.

2. The method of claim 1 wherein deflecting the plurality of ball bearings includes:
    for each ball, forging that ball along an elongated channel to concurrently (i) radially deflect a finger of the collect towards the bar and (ii) reposition the ball along the longitudinal axis.

3. The method of claim 1 wherein clamping the bar by the fingers of the collet includes:
    for each finger, compressing that finger against the bar to grab the bar in response to movement of exactly one ball bearing in direct contact with that finger.

4. The method of claim 1, further comprising:
    providing shop air at a pressure in a range of 50 to 80 pounds per square inch;
    providing the housing with a chamber having a clamping port and an unclamping port, the ports connected to the shop air; and
    porting the air through the clamping port to a first side of an annular ring of the piston that encircles the bore of the piston and divides the chamber of the housing to move the piston laterally.

5. The method of claim 4, further comprising:
    porting the air through the unclamping port to a second side of the annular ring and venting air from the clamping port to move the piston laterally in the opposite direction.

6. A method of clamping a bar, comprising:
    providing a collet assembly having a housing; a piston disposed within the housing, the piston defining a bore; and a collet disposed within the bore defined by the piston, the collet having a base and fingers which define a center bore extend along a longitudinal axis;

extending the bar through the center bore of the collet that extends along the longitudinal axis;

moving the piston from a first position to the second position in a direction along the longitudinal axis;

moving a plurality of ball bearings disposed between the piston and the fingers of the collet longitudinal and radially inward towards the longtitudinal axis by the movement of the piston from the first position and the second position along the longitudinal axis and a second position along the longitudinal axis; and clamping the bar by the fingers of the collet deflected radially inward by the ball bearings;

wherein aligned channels of the collet and the piston are at an angle of between 1 and 2 degrees from that of the longitudinal axis; and wherein moving the plurality of ball bearings includes deflecting the plurality of ball bearings along the aligned channels.

7. The method of claim 6 wherein the aligned channels of the collet and the piston are parallel to each other.

8. The method of claim 6 wherein clamping the bar by the fingers of the collet includes:

for each finger of the collet, compressing that finger against the bar to grab the bar in response to movement of exactly one ball bearing in direct contact with that finger.

9. A test apparatus for testing a drive mechanism, the test apparatus comprising:

a torsion bar carried by the drive mechanism;

at least one collet assembly, the collet assembly having a housing; a piston disposed within the housing, the piston defining a bore; a collet disposed within the bore defined by the piston, the collet having a base and fingers which define a center channel configured to receive the torsion bar, the central channel extending along a longitudinal axis of the collet assembly; and ball bearings disposed between the piston and the fingers of the collet, the piston being configured to move between a first position along the longitudinal axis and a second position along the longitudinal axis in response to pressure changes within the housing, the piston increasing force against the ball bearings to urge the fingers of the collet against the torsion bar to clamp the torsion bar when the torsion bar resides within the center channel and when the piston moves from the first position to the second position;

a controller for controlling the movement of the piston of the collet assembly; and a plurality of lines, one of the lines connecting the controller to a supply of pressured air, and at least a pair of lines connecting the controller to one of the collet assembly;

wherein the housing of the collet assembly defining a chamber having a clamping port and an unclamping port, the ports connected to the lines and the supply of the pressurized air; and the piston of the collet assembly having an annular ring encircling the bore and dividing the chamber, the annular ring having a pair of face walls, the first face wall in communication with the clamping port and the second face wall in communication with the unclamping port; the piston moved between the first position and the second position by the ports allowing pressurized air into and out of the chamber divided by the annular ring of the piston; and wherein each finger of the collet of the collet assembly has a finger ball channel, the finger ball channels of the fingers being angled such that the finger ball channels are further from the longitudinal axis at the distal end than at the base;

the bore of the piston of the collet assembly having a plurality of piston ball channels;

the collet of the collet assembly being received in the bore of the piston of the collet assembly such that the finger ball channel of each finger of the collet aligns with a piston ball channel of the piston, the piston ball channels of the piston angled such that the piston ball channels are further from the longitudinal axis at an end closer to the distal end of the fingers of the collet; and the plurality of ball bearings interposed in the ball channels between the collet and the piston to provide movement of the piston along the longitudinal axis towards the distal end of the fingers to force the ball bearings to compress the fingers of the collet to clamp the torsion bar.

10. The test apparatus of claim 9 wherein the aligned channels of the collet and the piston of each of the collet assemblies are at an angle of between 1 and 2 degrees from that of the longitudinal axis.

11. The test apparatus of claim 9 wherein the aligned channels of the collet and the piston of each of the collet assemblies are parallel to each other and the channels of the collet and the channels of the pistons are semi-cylindrical and have a diameter substantially equal to the diameter of the ball bearings to provide loading of the ball bearing along a line.

12. The test apparatus of claim 9 wherein, for each finger of the collet, exactly one ball bearing in direct contact with that finger is arranged to compress that finger against the torsion bar to grab the torsion bar in response to movement of that ball bearing.

* * * * *

UNITED STATES PATENT AND TRADEMARK OFFICE
CERTIFICATE OF CORRECTION

| | | |
|---|---|---|
| PATENT NO. | : 7,367,238 B2 | Page 1 of 1 |
| APPLICATION NO. | : 11/303407 | |
| DATED | : May 6, 2008 | |
| INVENTOR(S) | : John Stephen Hanks | |

It is certified that error appears in the above-identified patent and that said Letters Patent is hereby corrected as shown below:

Claim 2, Column 8, Line 38, "forging" should read --forcing--.

Signed and Sealed this

Twelfth Day of August, 2008

JON W. DUDAS
*Director of the United States Patent and Trademark Office*